United States Patent
Bai et al.

(10) Patent No.: US 7,894,821 B2
(45) Date of Patent: Feb. 22, 2011

(54) METHOD AND APPARATUS OF DYNAMIC SPECTRUM ALLOCATION IN COEXISTING HETEROGENEOUS WIRELESS NETWORKS

(75) Inventors: Yong Bai, Beijing (CN); Lan Chen, Beijing (CN); Kayama Hidetoshi, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 901 days.

(21) Appl. No.: 11/713,154

(22) Filed: Mar. 2, 2007

(65) Prior Publication Data

US 2007/0281710 A1  Dec. 6, 2007

(30) Foreign Application Priority Data

May 30, 2006  (CN) .................. 2006 1 0083526

(51) Int. Cl.
*H04W 72/00*  (2009.01)
(52) U.S. Cl. .................. 455/452.2; 455/450; 455/452.1
(58) Field of Classification Search .................. 455/450, 455/452.1, 453, 454, 455; 370/429, 352, 370/401
See application file for complete search history.

(56) References Cited

U.S. PATENT DOCUMENTS

| | | | |
|---|---|---|---|
| 5,034,993 A | | 7/1991 | Sasuta et al. |
| 6,650,655 B2 * | | 11/2003 | Alvesalo et al. ............. 370/468 |
| 7,069,045 B2 * | | 6/2006 | Wu et al. ..................... 455/560 |
| 2003/0050070 A1 * | | 3/2003 | Mashinsky et al. .......... 455/452 |
| 2006/0045069 A1 * | | 3/2006 | Zehavi et al. ................ 370/352 |
| 2006/0083205 A1 * | | 4/2006 | Buddhikot et al. .......... 370/338 |
| 2006/0176855 A1 * | | 8/2006 | Oh et al. ...................... 370/331 |
| 2006/0286986 A1 * | | 12/2006 | Kim et al. .................... 455/450 |
| 2007/0213069 A1 * | | 9/2007 | Ji et al. ........................ 455/450 |
| 2008/0108365 A1 * | | 5/2008 | Buddhikot et al. ........ 455/452.1 |
| 2008/0117869 A1 * | | 5/2008 | Freen et al. .................. 370/329 |
| 2008/0273493 A1 * | | 11/2008 | Fong ........................... 370/330 |
| 2008/0285499 A1 * | | 11/2008 | Zhang et al. ................ 370/315 |

FOREIGN PATENT DOCUMENTS

| | | |
|---|---|---|
| EP | 1494490 A1 | 1/2005 |
| WO | WO 99/17575 A2 | 4/1999 |

OTHER PUBLICATIONS

European Search Report for European Patent Application No. EP 07 00 2121, dated Sep. 24, 2007, 7 pages.

* cited by examiner

*Primary Examiner*—Jean A Gelin
(74) *Attorney, Agent, or Firm*—Blakely, Sokoloff, Tayor & Zafman LLP

(57) ABSTRACT

Embodiments of this disclosure include a method and apparatus of dynamic spectrum allocation in coexisting heterogeneous wireless networks. A Mobile Station (MS) detects its own serving Access Point (AP) and a coexisting AP (cAP) of the serving AP, sends to the serving AP a service request message carrying a bandwidth demand and a cAP ID. The serving AP sends to a Dynamic Spectrum Allocation Module (DSAM) a spectrum request message carrying its own AP ID, the cAP ID and the spectrum demand. The DSAM allocates the spectrum dynamically using a dynamic spectrum allocation algorithm according to the spectrum demand, AP ID and cAP ID, and sends a spectrum allocation result to the serving AP, which allocates an appropriate bandwidth to the MS according to the spectrum allocation result. Thus, sharing spectrum dynamically between multiple coexisting wireless networks can be achieved, and spectrum utilization can be improved.

19 Claims, 5 Drawing Sheets

METHOD AND APPARATUS OF DYNAMIC SPECTRUM ALLOCATION IN COEXISTING HETEROGENEOUS WIRELESS NETWORKS

PRIORITY

The present application claims priority to and incorporates by reference the entire contents of Chinese priority document 200610083526.6, filed in China on May 30, 2006.

FIELD OF THE TECHNOLOGY

The present invention relates to the technique for spectrum allocation in wireless networks, and particularly to a method and an apparatus for dynamic spectrum allocation in multiple coexisting heterogeneous wireless networks.

BACKGROUND OF THE INVENTION

The future wireless communication is expected to meet communication demands of users anytime and anywhere, and this vision gradually becomes achievable along with the remarkable progress of mobile devices and wireless networks. To support ubiquitous communication services in different coverage scales, the wireless networks may include small-area and wide-area wireless networks. The small-area wireless networking technologies (e.g. WLAN, WPAN, micro-cellular) enable local or hotspot services. On the other hand, wide-area wireless network (e.g. macro-cellular) infrastructures established by mobile operators provide services to subscribers in large areas. The small-area and wide-area wireless networks can be integrated together to provide complementary and new services to end users in different locations. Therefore, the evolution leads to a networking environment of integrated heterogeneous networks where multiple wireless networks coexist geographically to support a variety of global ubiquitous services.

In such a wireless networking environment, traffic loads of different wireless networks will change in space and time because of unequal user densities and traffic activities; therefore, Radio Resources Management (RRM), and particularly, spectrum management should be able to provide more efficient utilization of limited radio resources.

The conventional strategy of fixed spectrum management is to issue a spectrum license to a specific Radio Access Technology (RAT) to enable the specific RAT to occupy the spectrum exclusively. However, such a manner of spectrum management is unable to adapt to the changing of spectrum demands dynamically in space and time, and it hence leads to uneven spectrum utilization and artificial spectrum shortage. Therefore it is essential to improve the efficiency of spectrum usage, and achieve more intensive spectrum utilization by spectrum sharing technologies.

SUMMARY OF THE INVENTION

A method and apparatus of dynamic spectrum allocation in coexisting heterogeneous wireless networks are described. One embodiment of a method of dynamic spectrum allocation in coexisting heterogeneous wireless networks, comprises: detecting, by a Mobile Station (MS), a serving Access Point (AP) for the MS and a coexisting AP (cAP) of the serving AP, acquiring a cAP Identifier (ID) of the cAP, and sending to the serving AP a service request message containing the cAP ID and a bandwidth demand; upon receiving the service request message, sending, by the serving AP, to a Dynamic Spectrum Allocation Module (DSAM) a spectrum request message containing an AP ID of the serving AP, the cAP ID and a spectrum demand of the serving AP acquired according to one or more service request messages sent by the MS; allocating, by the DSAM, spectrum dynamically using a dynamic spectrum allocation algorithm according to the AP ID, the cAP ID and the spectrum demand obtained, and sending a spectrum allocation result to the serving AP; allocating, by the serving AP, an appropriate bandwidth to the MS according to the spectrum allocation result from the DSAM.

DETAILED DESCRIPTION OF THE INVENTION

Figure 1:
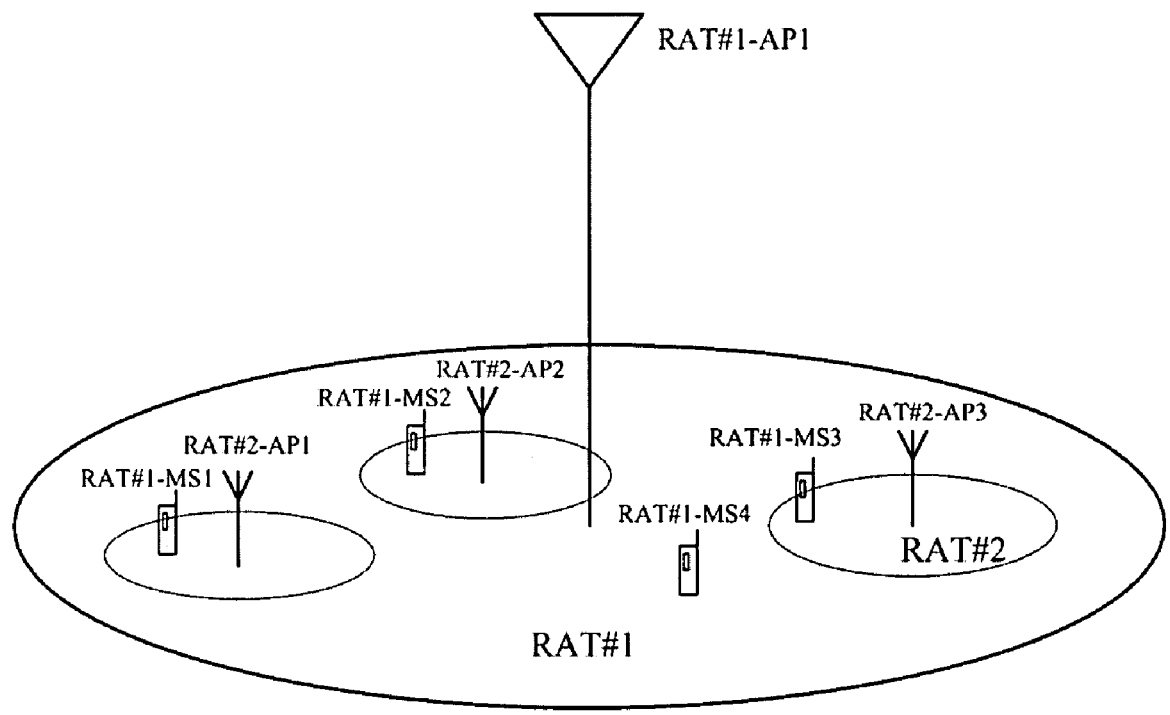
FIG. 1 is a schematic diagram illustrating a networking environment in which two wireless networks coexist to support various communication services.

An embodiment of this disclosure includes a method of dynamic spectrum allocation in coexisting heterogeneous wireless networks, which makes it possible to achieve dynamic spectrum allocation in space and time for multiple coexisting heterogeneous wireless networks.

One embodiment of a method of dynamic spectrum allocation in coexisting heterogeneous wireless networks in accordance with this disclosure includes: detecting, by a Mobile Station (MS), a serving Access Point (AP) of the MS and a coexisting AP (cAP) of the serving AP, acquiring a cAP Identifier (ID) of the cAP, and sending to the serving AP a service request message containing the cAP ID and a bandwidth demand;

upon receiving the service request message, sending, by the serving AP, to a Dynamic Spectrum Allocation Module (DSAM) a spectrum request message containing the AP ID of the serving AP, the cAP ID and a spectrum demand of the serving AP acquired from one or more service request messages sent by the MS;

allocating, by the DSAM, spectrum dynamically using a dynamic spectrum allocation algorithm according to the AP ID, the cAP ID and the spectrum demand obtained, and sending a spectrum allocation result to the serving AP; and allocating, by the serving AP, an appropriate bandwidth to the MS according to the spectrum allocation result from the DSAM.

In one embodiment, the process of sending the spectrum request message includes:

upon receiving one service request message, sending, by the serving AP, to the DSAM the spectrum request message corresponding to the service request message received; or upon receiving multiple service request messages, combining, by the serving AP, the multiple service request messages, and sending one aggregate spectrum request message to the DSAM.

In one embodiment, the serving AP determines when to send the spectrum request message according to at least one of a preset threshold of the spectrum demand and a preset time interval of the spectrum request message.

In one embodiment, the process of allocating, by the DSAM, the spectrum dynamically includes:

obtaining the spectrum demand, the AP ID and the cAP ID from the spectrum request message received;

searching, according to the AP ID, for a Spectrum Allocation Table (SAT) stored in the DSAM corresponding to the AP ID;

if there is no SAT for the AP ID, establishing an SAT corresponding to the AP ID with initial spectrum allocated for the serving AP of the MS as 0;

searching, in the SAT, for a spectrum allocation record corresponding to the cAP ID;

if there is no entry for the cAP ID in the SAT, adding a spectrum allocation record corresponding to the cAP ID in the SAT, with initial spectrum allocated for the cAP of the serving AP as 0;

obtaining, from the spectrum allocation record, the initial spectrum allocated for the serving AP and the initial spectrum allocated for the cAP, and obtaining the spectrum demand of the serving AP and a spectrum demand of the cAP according to the spectrum request message;

determining whether a sum of the spectrum demand of the serving AP and the spectrum demand of the cAP is greater than total spectrum that can be shared;

if the sum is greater than the total spectrum that can be shared, performing dynamic spectrum congestion resolution;

otherwise, if the sum is not greater than the total spectrum that can be shared, allocating an appropriate spectrum for the serving AP according to the spectrum demand of the serving AP; and updating the spectrum allocation record in the SAT according to the spectrum allocation result.

In one embodiment, the dynamic spectrum congestion resolution includes priority-based spectrum allocation, which includes satisfying a spectrum request of a RAT with higher priority first; reservation-based spectrum allocation, in which, during the process of allocating the spectrum dynamically, the spectrum actually obtained by a first AP of a coexisting Radio Access Technology (RAT) with reserved spectrum Nrev is a minimal value between the reserved spectrum Nrev and a spectrum demand of the first AP, and the spectrum obtained by a second AP of a coexisting RAT without reserved spectrum is a minimal value between a spectrum demand of the second AP and the difference between the total spectrum and the spectrum actually obtained by the first AP; or performing the dynamic spectrum congestion resolution according to spectrum allocation probabilities preset for each coexisting RAT.

In one embodiment, the reserved spectrum preset for the RAT or the spectrum allocation probabilities preset for each RAT is determined according to a spectrum outage probability and/or total revenue obtained from the coexisting RAT.

In one embodiment the method further includes: allocating spectrum for an AP of a coexisting RAT in advance;

before the process of determining whether the sum of the spectrum demand of the serving AP and the spectrum demand of the cAP is greater than the total spectrum that can be shared, if the spectrum demand of the serving AP is less than or equal to the spectrum allocated in advance, allocating, by the serving AP, the appropriate bandwidth to the MS requesting the spectrum, and performing the process of updating the spectrum allocation record in the SAT according to the spectrum allocation result; and otherwise, performing the process of determining whether the sum of the spectrum demand of the service AP and the spectrum demand of the cAP is greater than the total spectrum that can be shared.

In one embodiment, the method further includes reallocating the spectrum to the MS when the cAP changes because the MS moves.

In one embodiment, the process of reallocating the spectrum includes:

determining whether the sum of the spectrum demand of the serving AP of the MS and the spectrum demand of the cAP is greater than the total spectrum that can be shared;

if the sum is greater than the total spectrum that can be shared, performing the dynamic spectrum congestion resolution;

otherwise, allocating the appropriate spectrum to the serving AP according to the spectrum demand of the serving AP; and updating the spectrum allocation record in the SAT according to the spectrum allocation result.

In one embodiment, the method further includes:

when allocating the spectrum in the scale of sectors in the serving AP of the RAT, detecting, by the MS, a sector ID and containing the sector ID in the service request message; maintaining, by the DSAM, an SAT corresponding to a sector; wherein the spectrum is allocated differently between coexisting heterogeneous wireless networks in each sector of the serving AP.

Another embodiment of this disclosure includes an apparatus of dynamic spectrum allocation, which achieves dynamic spectrum allocation in space and time for multiple coexisting heterogeneous wireless networks.

In one embodiment, the apparatus of dynamic spectrum allocation includes:

a spectrum request processing module, for receiving spectrum request messages from Access Points (AP) of Radio Access Technologies (RATs), and obtaining parameters related to a spectrum request from the spectrum request messages;

a Spectrum Allocation Table (SAT) storing module, for storing a spectrum allocation record corresponding to a serving AP and a coexisting AP (cAP) of a RAT;

a dynamic spectrum allocation module, connected to the spectrum request processing module and the SAT storing module, for allocating spectrum dynamically using a dynamic spectrum allocation algorithm by searching for the spectrum allocation record stored in the SAT storing module according to the parameters related to the spectrum request from the spectrum request processing module;

a spectrum allocation result output module, connected to the dynamic spectrum allocation module, for outputting a dynamic spectrum allocation result from the dynamic spectrum allocation module to the AP sending the spectrum request message.

In one embodiment, when the spectrum is shared in the scale of sectors in the serving AP of one RAT, the SAT storing module is further for maintaining an SAT correspond to a sector of the serving AP in the RAT; the dynamic spectrum allocation module is further for allocating the spectrum in each sector between RATs; the spectrum allocation result output module is further for reporting a spectrum allocation result in each sector of the serving AP.

The apparatus of dynamic spectrum allocation communicates with the serving AP and the cAP in a wired or wireless manner.

As shown above, the method and apparatus of dynamic spectrum allocation in coexisting heterogeneous wireless networks in accordance with this disclosure may enable multiple APs of coexisting RATs to dynamically share spectrum using a certain spectrum allocation algorithm through an SAT maintained by a DSAM, which makes it possible to adapt to the dynamic changing of traffic of each wireless network in space and time, thereby prominently improving the spectrum utilization of the coexisting wireless networks.

In addition, the method and apparatus of dynamic spectrum allocation in coexisting wireless networks in accordance with this disclosure may further achieve dynamic spectrum congestion resolution when the total spectrum demand of multiple coexisting RATs exceeds the total spectrum that can be shared, in order to reduce the spectrum outage probability or to maximize the overall revenue obtained from the coexisting RATs.

Embodiments of the disclosure are hereinafter described in detail with reference to the accompanying drawings in order to make the technical solution and merits thereof more apparent.

A method and an apparatus of dynamic spectrum allocation are applicable to the network environment in which various wireless networks coexist. FIG. 1 is a schematic diagram illustrating a network environment in which two wireless networks coexist to support various communication services. It should be noted that this disclosure may be further applied in the communication in which more than two wireless networks coexist, which is still within the protection scope as claimed in appended claims.

In the network environment illustrated in FIG. 1, RATs used by two kinds of wireless networks are RAT#1 and RAT#2 respectively, which coexist in one geographical service area, in other words, service coverage areas of which are overlapped with each other in space. For example, as shown in FIG. 1, in the wireless coverage area of an AP of RAT#1 such as RAT#1-AP1, there are also the wireless coverage areas of APs of RAT#2 such as RAT#2-AP1, RAT#2-AP2 and RAT#2-AP3. In a real wireless communication system, the so called AP may be a base station in a cellular network or an AP in a Wireless LAN. RAT#1-MS1, RAT#1-MS2, RAT#1-MS3 and RAT#1-MS4 shown in FIG. 1 represent the MS-s served by RAT#1, and no MS served by RAT#2 is shown in FIG. 1.

If an MS served by RAT#1, e.g. RAT#1-MS1, is located in the wireless coverage area of RAT#1-AP1 and is served by RAT#1-AP1, RAT#1-AP 1 is the serving AP of RAT#1-MS1. In addition, RAT#1-MS1 is further in the wireless coverage area of RAT#2-AP1, therefore, RAT#2-AP1 is a coexisting AP (cAP) of the serving AP of RAT#1-MS1. As shown in FIG. 1, at this point, the serving AP of RAT#1-MS1 is RAT#1-AP1 and the cAP of the serving AP of RAT#1-MS1 is RAT#2-AP1. When RAT#1-MS1 moves into the wireless coverage area of RAT#2-AP2, its serving AP is still RAT#1-AP1 while the cAP of its serving AP changes to RAT#2-AP2.

In the network environment illustrated in FIG. 1, spectrum demands of RAT#1 and RAT#2 will change dynamically in space and time with the change of their own traffic loads, respectively. To improve the utilization of the spectrum, in the method of dynamic spectrum allocation in accordance with this disclosure, two RATs are capable of dynamically sharing all available spectrums in order to adapt to the changing of spectrum demands dynamically.

Figure 2:
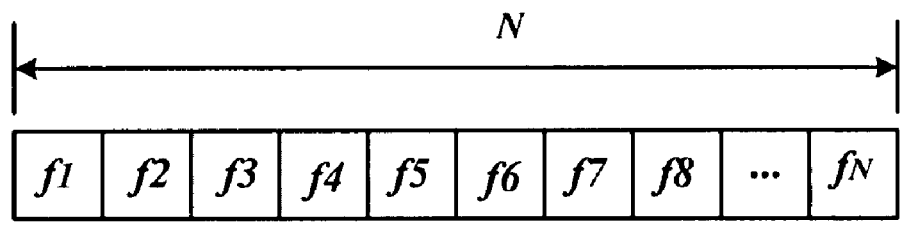
FIG. 2 is a schematic diagram illustrating all spectrum N shared by multiple RATs.

Suppose that the smallest unit of the spectrum to be allocated that can be partitioned and allocated is f, and all available spectrum shared by multiple RATs is Nf. For convenience, the symbol of the smallest unit f is omitted in the description hereinafter, and the available spectrum shared is represented by N. FIG. 2 is a schematic diagram illustrating all spectrum N shared by multiple RATs.

Figure 3:
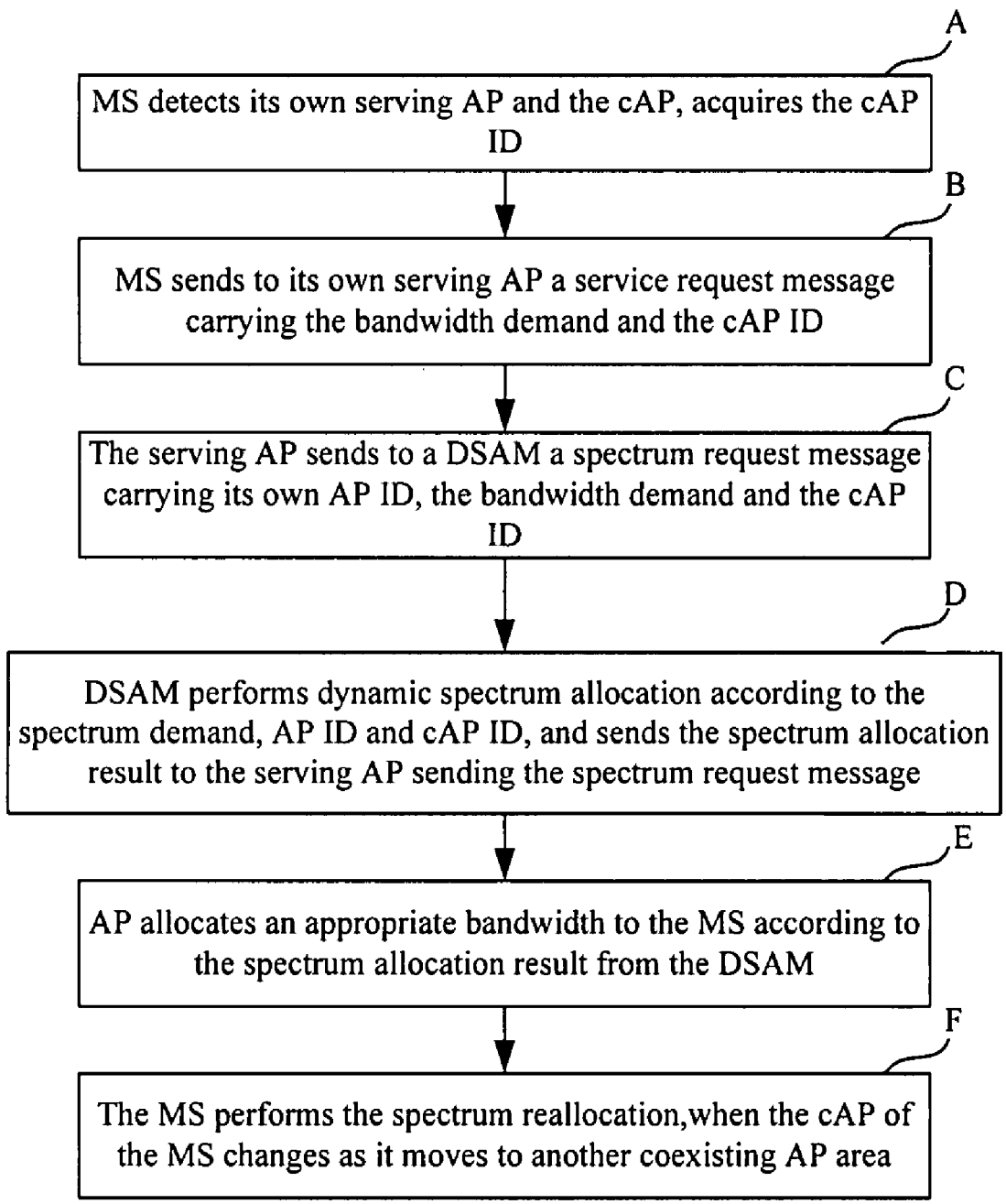
FIG. 3 is a flowchart of the method of dynamic spectrum allocation in accordance with a preferred embodiment of this disclosure.

To share the spectrum N between multiple RATs, a method of dynamic spectrum allocation between multiple coexisting RATs is presented in accordance with one embodiment of this disclosure. The implementing procedure of the method is shown in FIG. 3, mainly including the following processes.

In Step A, before requesting the spectrum needed for communications, the MS detects its serving AP and the cAP of the serving AP, and obtains an AP Identifier (ID) of the serving AP and a cAP ID of the cAP.

To implement Step A, the existing MS should be improved for detecting other APs adjacent to itself and coexisting with the serving AP. Specifically, dual-mode and multi-mode MSs may directly obtain the information about the coexisting AP of another RAT, and a single-mode MS may be notified of the coexisting AP through a common channel added in the coexisting RAT or may detect the coexisting AP with a beacon sent from the coexisting RAT.

In Step B, the MS sends to the serving AP of the MS a service request message containing both the bandwidth demand of the service and the cAP ID obtained in Step A.

In Step C, upon receiving the service request message, the serving AP obtains the spectrum demand of the serving AP according to the bandwidth demand of the communications carried in or deduced from the service request message, and sends to DSAM a spectrum request message containing the AP ID of the serving AP, the spectrum demand, and the cAP ID.

In this process, the serving AP may send the spectrum request message in multiple manners, for example, the serving AP may send to the DSAM one spectrum request message corresponding to the service request message immediately upon receiving one service request message; for another example, it may combine multiple service request messages and send one aggregate spectrum request message to the DSAM upon receiving the multiple service request messages, where the spectrum demand contained in the spectrum request message should be the sum of spectrum demands in the multiple service request messages. For the latter example, when to send the spectrum request message may be determined according to a preset threshold of the spectrum demand, a preset time interval of the spectrum request message, or a combination of the two. If the service request message sent from the MS to the serving AP further contains a traffic type of services conducted by the MS, the serving AP may set different spectrum demand thresholds and spectrum request time intervals according to the traffic type of services, for example, real-time traffic or non-real-time traffic.

The DSAM described in this process is a logic entity, which may be a separate network device or a module integrated into an existing network device, for example, integrated into an AP of one RAT. The connection from an AP of RAT to the DSAM can be wired or wireless. If the DSAM is integrated into RAT#1-AP1 as illustrated in FIG. 1, a spectrum request message corresponding to an AP of RAT#2 may be sent to the DSAM directly by the AP of RAT#2 or may be sent to RAT#1-AP1 by the AP of RAT#2 first, then forwarded to the DSAM by RAT#1-AP1.

In Step D, the DSAM allocates the spectrum dynamically using dynamic spectrum allocation algorithm according to the spectrum demand, the AP ID and the cAP ID which are obtained, and sends the spectrum allocation result to the serving AP sending the spectrum request message.

In Step E, the serving AP allocates an appropriate bandwidth to the MS according to the spectrum allocation result from the DSAM.

In Step F, when the MS moves to an area of another coexisting AP and the cAP of the MS changes, reallocate the spectrum for the MS.

Figure 4:
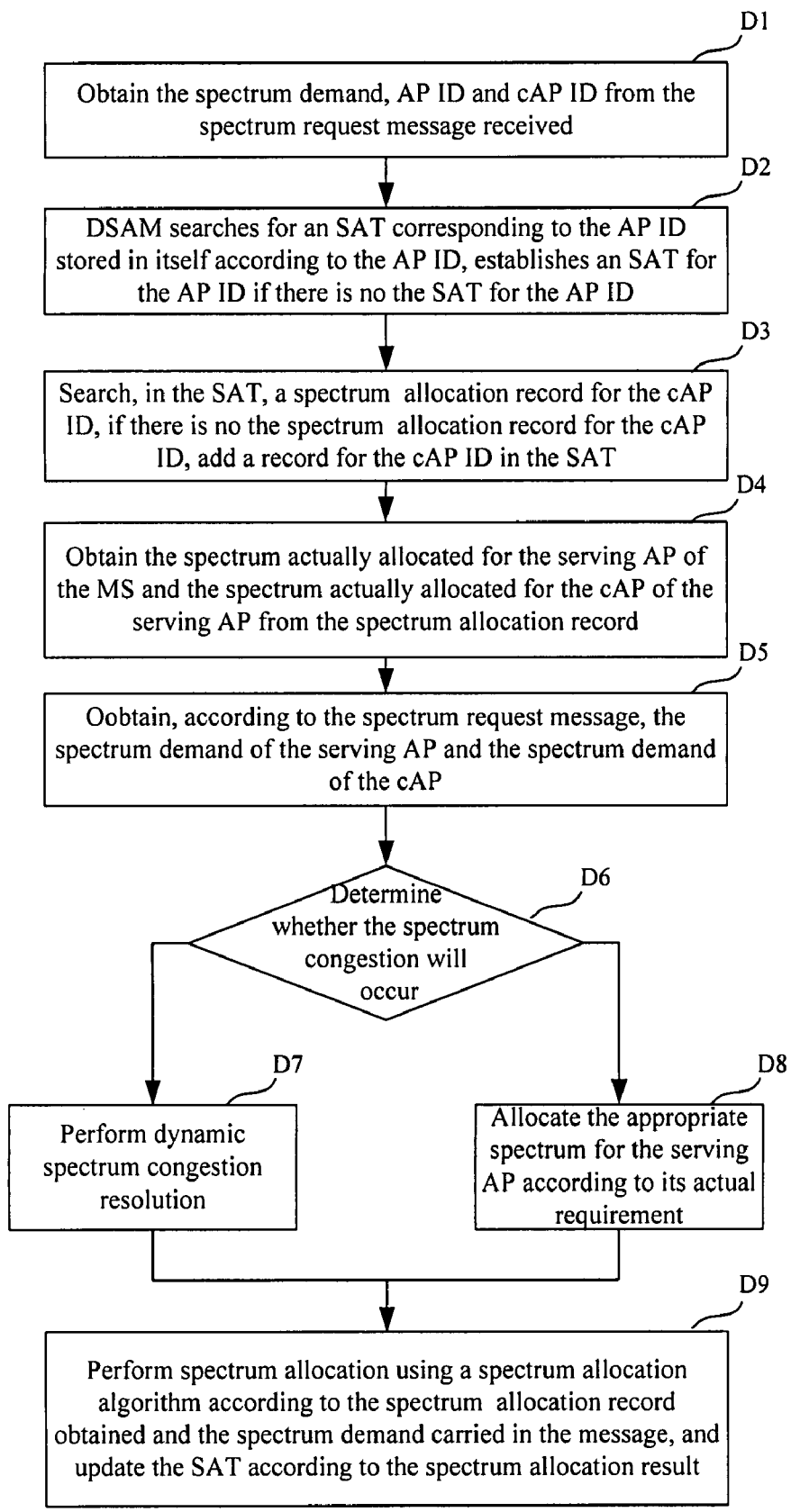
FIG. 4 is a flowchart illustrating the method for allocating by a DSAM the spectrum dynamically according to a dynamic spectrum allocation algorithm and an SAT in the method of dynamic spectrum allocation illustrated in FIG. 3.

Specifically, the process of reallocating the spectrum described in this process may be implemented though Steps D6-D9 illustrated in FIG. 4.

To implement the process of allocating the spectrum dynamically described in Step D, the DSAM establishes the SAT for each AP of RAT to store the spectrum allocation status. Table 1 is an exemplary SAT of RAT#1-AP1 illustrated in FIG. 1.

The SAT of RAT#1-AP1 illustrated in Table 1 includes one or more spectrum allocation records corresponding to the coexisting APs of the serving AP. The spectrum allocated for the serving AP is n1 and the spectrum actually allocated for its coexisting AP within the common coverage area of the AP is n2. According to the spectrum allocation records illustrated in Table 1, the DSAM may obtain the actual spectrum allocation between RAT#1-AP1 and its coexisting APs, for example RAT#2-AP1, RAT#2-AP2, and RAT#2-AP3.

TABLE 1

| Coexisting AP | Spectrum allocated to the serving AP (n1) | Spectrum allocated to the coexisting AP (n2) |
|---|---|---|
| RAT#2-AP1 | f1~f2 | f3~f10 |
| RAT#2-AP2 | f1~f8 | f9~f10 |
| RAT#2-AP3 | f1~f6 | f7~f10 |
| Others | f1-f10 | None |

In this process, the DSAM allocates the spectrum dynamically using the dynamic spectrum allocation algorithm according to the SAT, the method of which is shown in FIG. 4, mainly including the following processes.

In Step D1, obtain the spectrum demand, the AP ID and the cAP ID from the spectrum request message received.

In Step D2, search, according to the AP ID, for the SAT corresponding to the AP ID stored in the DSAM; if there is no SAT for the AP ID, establish an SAT corresponding to the AP ID, and set the spectrum n1 actually allocated for the serving AP as 0.

In Step D3, search the SAT for a spectrum allocation record corresponding to the cAP ID; if there is no spectrum allocation record for the cAP ID, add a spectrum allocation record for the cAP ID in the SAT, and set the spectrum n2 actually allocated to the cAP as 0.

In Step D4, obtain, from the spectrum allocation record, both the spectrum n1 actually allocated for the serving AP and the spectrum n2 actually allocated for the cAP of the serving AP.

In Step D5, obtain, according to the spectrum request message, the spectrum demand r1 of the serving AP and the spectrum demand r2 of the cAP.

In Step D6, determine whether there will be spectrum congestion, i.e. determine whether the sum of the spectrum demand r1 of the serving AP and the spectrum demand r2 of the cAP is greater than the total spectrum N that can be shared, if yes, proceed to Step D7; otherwise, proceed to Step D8.

In Step D7, perform dynamic spectrum congestion resolution.

In Step D8, allocate appropriate spectrum for the serving AP according to its actual spectrum demand.

In Step D9, update the corresponding spectrum allocation record in the SAT according to a spectrum allocation result.

This embodiment presents three methods for performing dynamic spectrum congestion resolution to implement Step D7 above.

Method One: Priority-Based Spectrum Allocation.

With the strategy of priority-based spectrum allocation, a spectrum request with higher priority will obtain the spectrum needed.

The priority may be determined simply according to the RAT initiating the spectrum request. For example, the priority of the spectrum request initiated by RAT#1 may be set higher than that of the spectrum request initiated by RAT#2. In this case, the spectrum demand of RAT#1 is satisfied first, in particular, the spectrum is allocated by using the formula of n1=min(r1, N), n2=min(r2, N-n1).

Alternatively, the priority may be determined according to the importance of the traffic that requests the bandwidth. The importance of the traffic may be classified according to the traffic type or the revenue obtained from the traffic by the operator. For example, the priority of a voice traffic should be set higher than that of a data traffic because of the real-time requirement of the voice traffic; the priority of a real-time traffic should be set higher than that of a non-real-time traffic; the priority of a traffic bringing about higher income should be set higher than that of a traffic bringing about lower revenue, and so on. In a process of actual spectrum allocation, if the priority of the spectrum request is determined according to the traffic type, the MS needs to further add the traffic type in the service request message described in Step A and the serving AP needs to send the traffic type to the DSAM in the spectrum request message described in Step B to perform the process of allocating the spectrum dynamically.

To meet the bandwidth demand of the traffic with higher priority, the traffic served currently may be designed as interruptible traffic and non-interruptible traffic. If the traffic served currently is the interruptible traffic, the traffic may be interrupted when the spectrum congestion occurs, and the spectrum released by the traffic may be allocated to other traffics with higher priority. If the traffic served currently is non-interruptible traffic, a new spectrum request is unable to obtain appropriate spectrum until the traffic served currently is finished.

It can be seen from the method of priority-based spectrum allocation above that a RAT supporting higher priority may occupy all available spectrum exclusively, which may result in low Quality of Service (QoS) of the RAT supporting lower priority services.

Method Two: Reservation-Based Spectrum Allocation.

In the strategy of reservation-based spectrum allocation, certain spectrum is reserved for one or several RATs of various coexisting RATs, respectively, and the spectrum reserved are referred to as reserved spectrum Nrev. The reserved spectrum is the guaranteed spectrum for the one or several RATs when there is the spectrum congestion between multiple RATs. In the actual process of allocating the spectrum, if the spectrum congestion occurs, the specific method of the reservation-based spectrum allocation includes:

setting reserved spectrum of RAT, Nrev; the spectrum actually obtained by the RAT being the minimum of the reserved spectrum Nrev and the spectrum demand of the RAT; the spectrum obtained by other RATs for which no reserved spectrum is set is the minimum of the remaining spectrum (i.e., the difference between the total spectrum shared and all the reserved spectrum) and the spectrum demand of the RAT. For example, in the network environment illustrated in FIG. 1, if the reserved spectrum for RAT#2 is Nrev2, the spectrum allocation between RAT#2 and RAT#1 is n2=min(r2, Nrev2), n1=min(r1, N−n2). As can be seen from the method of allocating the spectrum above, when the spectrum demand of one RAT is less than the reserved spectrum for the RAT, the reserved spectrum can be shared by other RATs.

Method Three: Probability-Based Spectrum Allocation.

By such strategy, when the spectrum congestion occurs, the spectrum can be allocated according to spectrum allocation probabilities preset for each coexisting RAT. For example, in the network environment illustrated in FIG. 1, the spectrum allocation probabilities of RAT#1 and RAT#2 are preset as p1 and p2 respectively in case of spectrum congestion. In this case, the DSAM may allocate the spectrum according to the spectrum allocation probabilities. The p1 and p2 may be determined according to the criterion described hereinafter.

With Methods two and three above, the spectrum can be allocated between multiple RATs to achieve certain level of fairness and balance the QoS of multiple RATs.

As can be seen from the above description, with the method of dynamic spectrum allocation in accordance with this embodiment, the available spectrum can be shared and allocated dynamically when multiple wireless networks coexist.

To further simplify the method of dynamic spectrum allocation in accordance with this embodiment, certain spectrum may be allocated in advance for each AP of coexisting RATs in accordance with another preferred embodiment of this disclosure. In this way, initial values of the spectrum n1 and the spectrum n2 allocated for the serving AP and the coexisting AP in Steps D2 and D3 are not 0.

When a spectrum demand of an AP of RAT is less than or equal to the spectrum allocated in advance, for example, in the case of r1≦n1 or r2≦n2, the AP in that RAT may directly allocate the appropriate bandwidth to the MS requesting the spectrum without requesting more spectrum from the DSAM; only when the spectrum demand of an AP in one RAT is greater than the spectrum allocated in advance, for example, in the case of r1>n1 or r2>n2, will the AP of the RAT request more spectrum from the DSAM, and the process of requesting spectrum is described in Steps A-E above. The process of allocating the spectrum implemented according to such a preferred embodiment can reduce the signaling overhead of spectrum allocation.

This embodiment further puts forward a method of determining the reserved spectrum and determining the spectrum allocation probabilities of the coexisting RAT in case of spectrum congestion; the description is hereinafter given in detail by taking the network environment in which two RATs coexist as an example.

Figure 5:
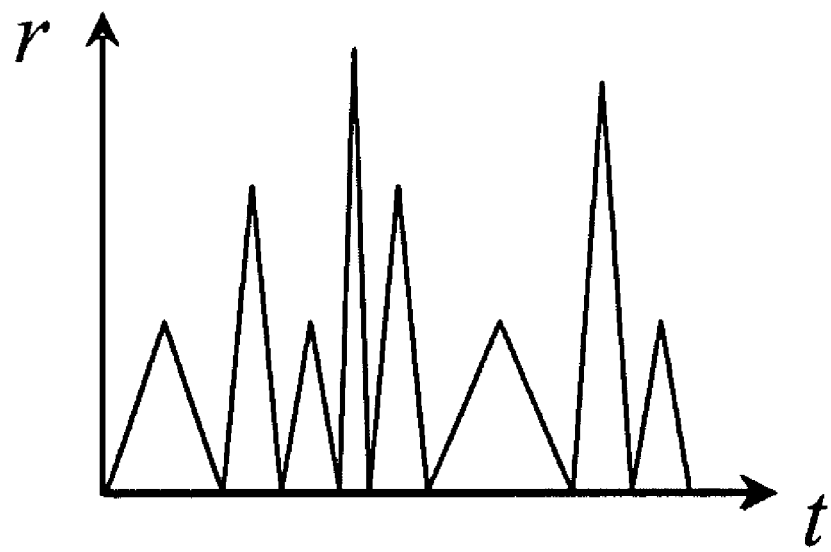
FIG. 5 is a diagram illustrating the varying spectrum demand of RAT with time.
Figure 6:
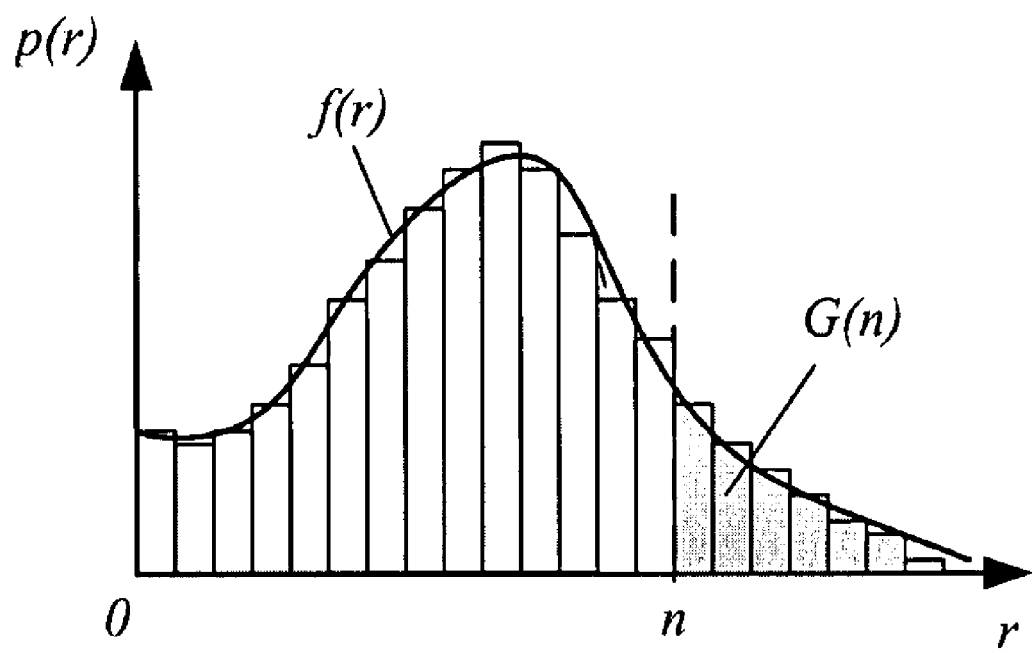
FIG. 6 is a diagram illustrating the probability density function of the spectrum demand of RAT.

The mid-term and long-term spectrum demand of one RAT may be measured as a discrete probability density function p(r), in which r is a variable representing the spectrum demand of the RAT. To obtain the value of p(r), a change of traffic load of the RAT may be collected within a short term, e.g. per minute, per hour and per day, and a change of spectrum demand corresponding to the change of traffic load of the RAT may be deducted in the same time scale. In this way, the mid-term and long-term (larger time scale measured in the unit of month or year) spectrum demand of RAT may be deducted according to the changing of spectrum demand in the short-term. FIG. 5 is a diagram illustrating the changing of spectrum demand r of RAT with time. FIG. 6 is a diagram illustrating the probability distribution function of the spectrum demand of RAT. The discrete probability density function p(r) of the spectrum demand may be obtained from the histogram of the time-varying spectrum demand collected, which approaches to a continuous probability density function j(r). In FIG. 6, n represents the spectrum actually allocated for the RAT.

F(r) represents a cumulative distribution function of spectrum demand variable r, and the Spectrum Outage Probability (SOP) G(n) is further defined as the probability that the spectrum demand variable r exceeds the allocated spectrum n. The computational formula of which is as follows:

$$G(n)=Pr(r>n)=\int_n^\infty f(r)dr=1-F(n)$$

In FIG. 6, the SOP G(n) is shown as the shadow area which is both under the curve f(r) and at the right side of vertical line n of the spectrum allocated. The SOP defined can be used to indicate the provided QoS of the RAT from the perspective of spectrum availability.

Gi (i=1, 2) represents the values of SOPs of two RATs, respectively. In Method two described in the Step D9, Gi is the functions of the reserved spectrum Nrev1 and Nrev2 preset for the RATs. In Method three described in the Step D9, Gi is the functions of the spectrum allocation probabilities p1 and p2 of coexisting RAT preset in case of spectrum congestion.

In this embodiment, four different criteria are hereinafter put forward to enable wireless network operators to determine the reserved spectrum Nrev1 and Nrev2 and the spectrum allocation probabilities p1 and p2 for RATs in case of spectrum congestion.

max R.      Criterion I

R represents the total revenue obtained from two RATs. Such a criterion only considers the revenue of wireless network operators. In Method two described in Step D9, R is the function of reserved spectrum Nrev1 and Nrev2 for the RATs. In Method three described in Step D9, R is the function of spectrum allocation probabilities p1 and p2 of coexisting RAT in case of spectrum congestion.

$Gi \leq \delta i$, $(0<\delta_i \leq 1)$ $i=1, 2$.      Criterion II

Gi (i=1, 2) represents the values of SOPs of two RATs, respectively, and $\delta_i$ (i=1,2) represents the threshold values of SOPs set for two RATs, respectively. Therefore, such a criterion only considers the QoS that two RATs can provide.

max R s.t. $Gi \leq \delta i$, $(0<\delta_i \leq 1)$ $i=1, 2$.      Criterion III This criterion takes into account both the revenue of wireless network operators and the QoS that each RAT can provide, thus achieving a certain balance between the revenue and the QoS provided.

$Gi \leq \delta i$, $(0<\delta_i \leq 1)$ $i=1, 2$ s.t. $R \geq \alpha R\max(0<\alpha \leq 1)$.      Criterion IV In Criterion IV, Rmax represents the maximal revenue obtained by wireless network operators under the condition of the Criterion I, and a represents a preset coefficient. This criterion also takes into account both the revenue of wireless network operators and the QoS that each RAT can provide, thus achieving a certain balance between the revenue and the QoS provided.

The spectrum may be allocated in the scale of sectors in the serving AP of one RAT according to the method of dynamic spectrum allocation. In each sector of the serving AP, the spectrum can be allocated differently between coexisting heterogeneous wireless networks.

When allocating the spectrum by sector, the method of dynamic spectrum allocation may be implemented similarly according to the embodiments above, except that, the MS further detects a sector ID and includes the sector ID in the service request message; and the DSAM further maintains one SAT for each sector and allocates the spectrum for each sector dynamically using dynamic spectrum allocation algorithm according to the spectrum demand, the sector ID, the AP ID and the cAP ID.

Figure 7:
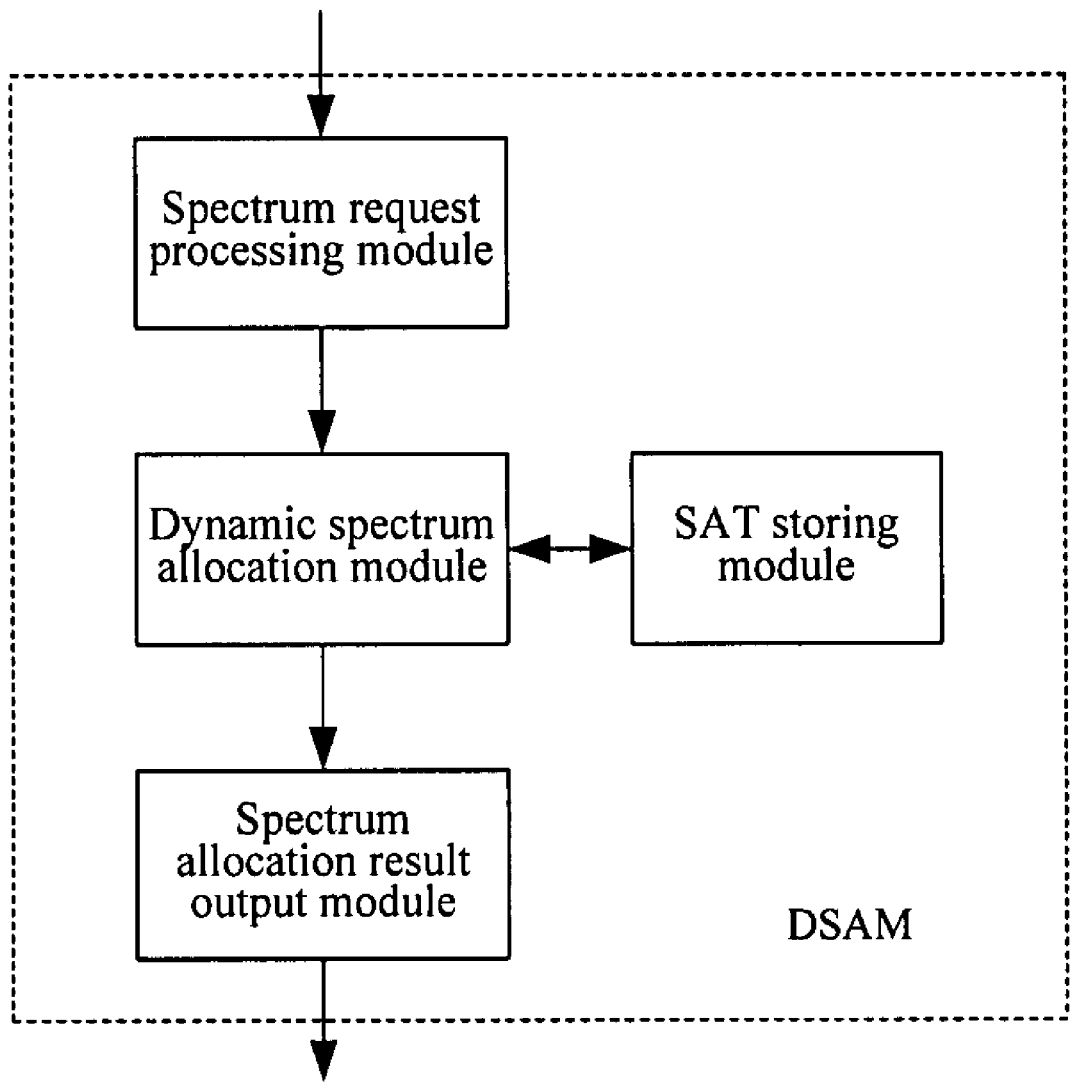
FIG. 7 is a schematic diagram illustrating the structure of the DSAM in accordance with a preferred embodiment of this disclosure.

In another embodiment, a DSAM for allocating spectrum dynamically is further provided to implement the method for allocating spectrum dynamically above, and the internal structure of the DSAM is shown in FIG. 7, including:

a spectrum request processing module, for receiving spectrum request messages from APs of various RATs, and obtaining parameters related to a spectrum request from the spectrum request messages, for example, the spectrum demand, AP ID, cAP ID and so on;

an SAT storing module, for storing an SAT corresponding to an AP of a RAT;

a dynamic spectrum allocation module, connected to the spectrum request processing module and the SAT storing module, for allocating spectrum dynamically using dynamic spectrum allocation algorithm through searching for the SAT stored in the SAT storing module according to the parameters related to the spectrum request from the spectrum request processing module; and a spectrum allocation result output module, connected to the dynamic spectrum allocation module, for outputting a dynamic spectrum allocation result from the dynamic spectrum allocation module to the AP of the RAT sending the spectrum request message.

The dynamic spectrum allocation module may allocate the spectrum dynamically according to the method for allocating the spectrum described in Steps D1-D9.

When the spectrum is shared in the scale of sectors in the serving AP of the RAT, the SAT storing module is further for maintaining one SAT for each sector of the serving AP in the RAT; the dynamic spectrum allocation module is further for allocating the spectrum in each sector between RATs; the spectrum allocation result output module is further for reporting a spectrum allocation result in each sector of the serving AP.

The DSAM with the structure above may process the spectrum request message from an AP of any RAT and allocate the spectrum needed for the AP. And, the DSAM may allocate the spectrum dynamically in case of spectrum congestion.

The foregoing are only preferred embodiments of the disclosure and are not for use in limiting the disclosure, any modification, equivalent replacement or improvement made under the spirit and principles of the disclosure is included in the protection scope of the disclosure.

What is claimed is:

1. A method of dynamic spectrum allocation in coexisting heterogeneous wireless networks, comprising:

detecting, by a Mobile Station (MS), a serving Access Point (AP) for the MS and a coexisting AP (cAP) of the serving AP, acquiring a cAP Identifier (ID) of the cAP, and sending to the serving AP a service request message carrying the cAP ID and a bandwidth demand; the serving AP belonging to a Radio Access Technology (RAT) and the cAP belonging to another type of RAT;

upon receiving the service request message, sending, by the serving AP, to a Dynamic Spectrum Allocation Module (DSAM) a spectrum request message carrying an AP ID of the serving AP, the cAP ID and a spectrum demand of the serving AP acquired according to one or more service request messages sent by the MS, the DSAM being a separate network device or integrated into an existing network device;

dynamically allocating, by the DSAM, spectrum out of spectrums shared between the RAT and the another type of RAT using a dynamic spectrum allocation algorithm respectively to the AP and the cAP according to the AP ID, the cAP ID and the spectrum demand obtained, and sending a spectrum allocation result to the serving AP; the dynamic spectrum allocation result containing a spectrum amount allocated to the serving AP and a spectrum amount allocated to the cAP;

allocating, by the serving AP, an appropriate bandwidth to the MS according to the spectrum allocation result from the DSAM.

2. The method of claim 1, wherein the process of sending the spectrum request message comprises:

upon receiving one service request message, sending, by the serving AP, to the DSAM the spectrum request message corresponding to the service request message received.

3. The method of claim 1, wherein the process of sending the spectrum request message comprises:

upon receiving multiple service request messages, combining, by the serving AP, the multiple service request messages, and sending one aggregate spectrum request message to the DSAM.

4. The method of claim 3, wherein the serving AP determines when to send the spectrum request message according to at least one of a preset threshold of the spectrum demand and a preset time interval of the spectrum request message.

5. The method of claim 1, wherein the process of allocating, by the DSAM, the spectrum dynamically comprises:

obtaining the spectrum demand, the AP ID and the cAP ID from the spectrum request message received;

searching, according to the AP ID, for a Spectrum Allocation Table (SAT) stored in the DSAM corresponding to the AP ID;

if there is no SAT for the AP ID, establishing an SAT corresponding to the AP ID with initial spectrum allocated for the serving AP of the MS as 0;

searching, in the SAT, for a spectrum allocation record corresponding to the cAP ID;

if there is no entry for the cAP ID in the SAT, adding a spectrum allocation record corresponding to the cAP ID in the SAT, with initial spectrum allocated for the cAP of the serving AP as 0;

obtaining, from the spectrum allocation record, the initial spectrum allocated for the serving AP and the initial spectrum allocated for the cAP, and obtaining the spectrum demand of the serving AP and a spectrum demand of the cAP according to the spectrum request message;

determining whether a sum of the spectrum demand of the serving AP and the spectrum demand of the cAP is greater than total spectrum that can be shared;

if the sum is greater than the total spectrum that can be shared, performing dynamic spectrum congestion resolution;

otherwise, if the sum is not greater than the total spectrum that can be shared, allocating an appropriate spectrum for the serving AP according to the spectrum demand of the serving AP;

updating the spectrum allocation record in the SAT according to the spectrum allocation result.

6. The method of claim 5, wherein the dynamic spectrum congestion resolution comprises priority-based spectrum allocation, which comprises satisfying a spectrum request with higher priority first.

7. The method of claim 5, wherein the dynamic spectrum congestion resolution comprises reservation-based spectrum allocation, in which during the process of allocating the spectrum dynamically, the spectrum actually obtained by a first AP of a coexisting Radio Access Technology (RAT) with reserved spectrum Nrev is a minimal value between the reserved spectrum Nrev and a spectrum demand of the first AP, and the spectrum obtained by a second AP of a coexisting RAT without reserved spectrum is a minimal value between a spectrum demand of the second AP and the difference between the total spectrum and the spectrum actually obtained by the first AP.

8. The method of claim 7, wherein the reserved spectrum preset for the coexisting RAT is determined by a criterion designed according to a spectrum outage probability and/or total revenue obtained from the coexisting RAT.

9. The method of claim 5, wherein the process of performing the dynamic spectrum congestion resolution comprises: performing the dynamic spectrum congestion resolution according to spectrum allocation probabilities preset for each coexisting RAT.

10. The method of claim 9, wherein the spectrum allocation probabilities preset for each coexisting RAT are determined by a criterion designed according to the spectrum outage probability and/or the total revenue obtained from the coexisting RAT.

11. The method of claim 5, further comprising: allocating spectrum for an AP of a coexisting RAT in advance;
before the process of determining whether the sum of the spectrum demand of the serving AP and the spectrum demand of the cAP is greater than the total spectrum that can be shared,
if the spectrum demand of the serving AP is less than or equal to the spectrum allocated in advance, allocating, by the serving AP, the appropriate bandwidth for the MS requesting the spectrum, and performing the process of updating the spectrum allocation record in the SAT according to the spectrum allocation result;
otherwise, performing the process of determining whether the sum of the spectrum demand of the serving AP and the spectrum demand of the cAP is greater than the total spectrum that can be shared.

12. The method of claim 1, further comprising:
reallocating the spectrum for the MS when the cAP changes because the MS moves.

13. The method of claim 12, wherein the process of reallocating the spectrum comprises:
determining whether the sum of the spectrum demand of the serving AP of the MS and the spectrum demand of the cAP is greater than the total spectrum that can be shared;
if the sum is greater than the total spectrum that can be shared, performing the dynamic spectrum congestion resolution;
otherwise, allocating the appropriate spectrum for the serving AP according to the spectrum demand of the serving AP;
updating the spectrum allocation record in the SAT according to the spectrum allocation result.

14. The method of claim 1, further comprising:
when allocating the spectrum in the scale of sectors in the serving AP of the RAT, detecting, by the MS, a sector ID and carrying the sector ID in the service request message; maintaining, by the DSAM, an SAT corresponding to a sector;
wherein
the spectrum is allocated differently between coexisting heterogeneous wireless networks in each sector of the serving AP.

15. The method of claim 1, wherein a coverage area of the serving AP overlaps a coverage area of the cAP.

16. An apparatus of dynamic spectrum allocation, comprising:
a spectrum request processing module, for receiving spectrum request messages from Access Points (AP) of Radio Access Technologies (RATs), and obtaining, from the spectrum request messages, parameters related to a spectrum request;
a Spectrum Allocation Table (SAT) storing module, for storing a spectrum allocation record corresponding to a serving AP belonging to a RAT and a coexisting AP (cAP) belonging to another type of RAT;
a dynamic spectrum allocation module, which is a separate network device or is a module integrated into an existing network device, connected to the spectrum request processing module and the SAT storing module, for dynamically allocating spectrum out of spectrums shared between the RAT and the another type of RAT using a dynamic spectrum allocation algorithm respectively to the serving AP and the cAP through searching for the spectrum allocation record stored in the SAT storing module according to the parameters related to the spectrum request from the spectrum request processing module;
a spectrum allocation result output module, connected to the dynamic spectrum allocation module, for outputting a dynamic spectrum allocation result from the dynamic spectrum allocation module to the AP sending the spectrum request message; dynamic spectrum allocation result containing a spectrum amount allocated to the serving AP and a spectrum amount allocated to the cAP.

17. The apparatus of claim 16, wherein the apparatus of dynamic spectrum allocation communicates with the serving AP and the cAP in a wired or wireless manner.

18. The apparatus of claim 16, wherein the SAT storing module is for maintaining an SAT corresponding to a sector of the serving AP in the RAT;
the dynamic spectrum allocation module is for allocating the spectrum in each sector between RATs;
the spectrum allocation result output module is for reporting a spectrum allocation result in each sector of the serving AP.

19. The method of claim 16, wherein a coverage area of the serving AP overlaps a coverage area of the cAP.

* * * * *